United States Patent [19]
Simpson

[11] Patent Number: 5,606,347
[45] Date of Patent: Feb. 25, 1997

[54] DEVICES SYSTEMS AND METHODS FOR FLEXIBLE FORMAT DATA STORAGE

[75] Inventor: Richard D. Simpson, Bedford, England

[73] Assignee: Texas Instruments Incorporated, Dallas, Tex.

[21] Appl. No.: 474,640

[22] Filed: Jun. 7, 1995

Related U.S. Application Data

[63] Continuation of Ser. No. 991,234, Dec. 16, 1992.
[51] Int. Cl.⁶ .................................................... G09G 5/04
[52] U.S. Cl. .......................... 345/187; 345/200; 345/201; 345/190
[58] Field of Search ..................................... 345/187, 188, 345/189, 190, 192, 193, 200, 201, 203

[56] References Cited

U.S. PATENT DOCUMENTS 4,935,730  6/1990  Kosuka .................... 345/187

*Primary Examiner*—Curtis Kuntz
*Assistant Examiner*—Vivian Chang
*Attorney, Agent, or Firm*—Robert D. Marshall, Jr.; James C. Kesterson; Richard L. Donaldson

[57] ABSTRACT

A memory device 72 is provided which includes a plurality of data storage locations each having an associated address and arranged as a plurality of planes 76. A data port 78, 86 is coupled to each of the planes 76. Control circuitry 78, 80, 82 is provided and includes inputs receiving an address and a mode control signal, the control circuitry operable in the first mode to provide access through data port 78, 86 to an addressed location in each of the plurality of planes 76 and in a second mode to provide access through the data port 78, 86 to a plurality of storage locations in a selected one of the planes 76.

19 Claims, 6 Drawing Sheets

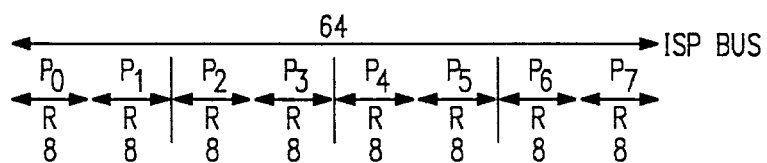
FIG. 7
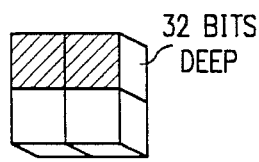
FIG. 8a   FIG. 8b
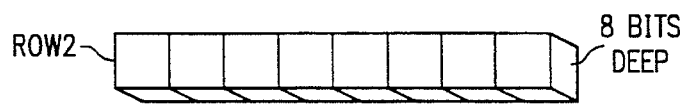
FIG. 9a
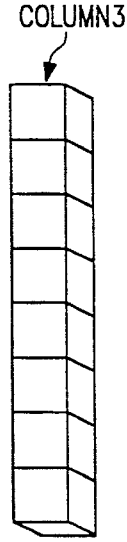
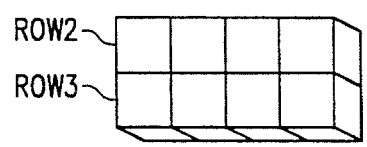
FIG. 9b
FIG. 9c   FIG. 9d
FIG. 10

DEVICES SYSTEMS AND METHODS FOR FLEXIBLE FORMAT DATA STORAGE

This is a continuation of application Ser. No. 07/991,234 filed Dec. 16, 1992.

NOTICE (C) Copyright, *M* Texas Instruments Incorporated, 1990. A portion of the Disclosure of this patent document contains material which is subject to copyright protection. The copyright and mask work owner has no objection to facsimile reproduction by anyone of the patent document or the patent disclosure, as it appears in the U.S. Patent and Trademark Office, patent file or records, but otherwise reserves all rights in its copyright and mask work whatsoever.

CROSS-REFERENCE TO RELATED APPLICATIONS

The following coassigned applications are hereby incorporated herein by reference:

U.S. patent application Ser. No. 07/435,591, Attorney Docket No. TI-14608, entitled "Multiple Processor and Crossbar Link of Processors and Memories", filed Nov. 17, 1989;

U.S. Pat. No. 5,233,690, entitled "Video Graphics Display Memory Swizzle Logic And Expansion Circuit And Method", issued Aug. 3, 1993;

U.S. Pat. No. 5,269,001, entitled "Video Graphics Display Memory Swizzle Logic Circuit And Method", filed Dec. 7, 1993; and U.S. patent application Ser. No. 07/457,992, entitled "Apparatus and Method For Coupling A Multi-Lead Output Bus to Interleaved Memories, Which are Addressable in Normal and Block-Write Modes", issued Feb. 15, 1994;

U.S. Pat. No. 4,807,189, entitled "A Memory Having a Multiple Column Select Mode", issued Feb. 21, 1989;

U.S. Pat. No. 4,636,986, entitled "Separately Addressable Memory Array in a Multiple Array Sense Conductor Chip", issued Jan. 13, 1987;

U.S. Pat. No. 4,639,890, entitled "Video Display System Using Memory with Parallel and Serial Access Displaying Selectable Cascaded Serial Shift", issued Jan. 27, 1987;

U.S. Pat. No. 4,562,435, entitled "Video Display System Using Serial/Parallel Access Memories", issued Dec. 31, 1985.

TECHNICAL FIELD OF THE INVENTION

The present invention relates in general to digital processing systems and in particular to devices, systems and methods for flexible format data storage.

BACKGROUND OF THE INVENTION

A typical graphics processing system includes a frame buffer which holds bit-mapped data generated by the graphics processor which corresponds to the pixels of a frame of an image to be displayed. The pixel data stored in the frame buffer is then available for either processing, such as filtering, by the graphics system processor or for output to the backend circuitry driving the system display device.

Contemporary frame buffers are usually constructed using video random access memory devices (VRAMs) which include an address port, a random access data port for communicating with the graphics processor, and a serial port for communicating with the display driver circuitry. The storage elements of the VRAMs are typically arranged in rows and columns such that the pixel data can be stored in a manner which organizationally corresponds to the lines (rows and columns) of pixels on the display. Further, the VRAMs usually are organized in multiple planes with the same location in each plane accessed with a single address such that multiple bit words can be transferred to and from that location in a single address cycle.

In one graphics system data format, a pixel is defined in terms of red, green, and blue color data and a blending factor alpha. For example, in a 32-bit system a given pixel may be defined by a 32-bit word composed of 8-bits each of red, green, blue, and alpha data. In the frame buffer, the 32-bit word of pixel data or simply "pixel" may be stored across thirty-two planes of one or more parallel VRAMs for access with a single address through the random port.

During data processing it may not always be desirable to access a whole pixel for a given operation. For instance, it may be advantageous to perform filtering on only one particular portion of the data defining an image in the frame buffer, such as the red data. At the same time, for other operations it still may be desirable to access "whole" pixels or red, green, blue and alpha color data. This requirement that during some operations whole pixels be accessible and during other operations only portions of pixels be accessible can burden system operation, for example, by requiring unnecessary addressing/access operations.

Thus, the need has arisen for devices, systems and methods which allow for efficient access of either whole data words or portions of data words stored in a memory as required by a given data processing operation.

SUMMARY OF THE INVENTION

According to the invention a memory device is provided which includes a plurality of data storage locations, each having an associated address, arranged as a plurality of planes. A data port is coupled to each of the planes. Control circuitry is provided having inputs for receiving an address and a mode control signal, the control circuitry operable in a first mode to provide access through the data port to an addressed location in each of the plurality of planes and in a second mode to provide access through the data port to a plurality of storage locations in a selected one of the planes.

The memory device according to one embodiment of the present invention allows the efficient access of either whole data words or portions of data words stored therein. Further, the memory device according to an embodiment of the present invention allows for the efficient access of the data stored in a local area in a memory system.

BRIEF DESCRIPTION OF THE DRAWINGS

For a more complete understanding of the present invention, and the advantages thereof, reference is now made to the following descriptions taken in conjunction with the accompanying drawings, in which:

FIG. 7 depicts one possible gun prefered organization of graphics data on the data bus shown in FIG. 1;

FIGS. 8a–b are geometric representations of possible accesses of whole pixels from the memory shown in FIGS. 1, 4 and 5;

FIGS. 9a–d are geometric representations of possible accesses of portions of pixels (gun portions) from the memory of FIGS. 1, 4 and 5;

FIG. 10 depicts a red gun sort by the transfer processor of FIG. 2;

DETAILED DESCRIPTION OF PREFERRED EMBODIMENTS

The preferred embodiment of the present invention and its advantages are best understood by referring to FIGS. 1–12 of the drawings, like numerals being used for like and corresponding parts of the various drawings.

Figure 1:
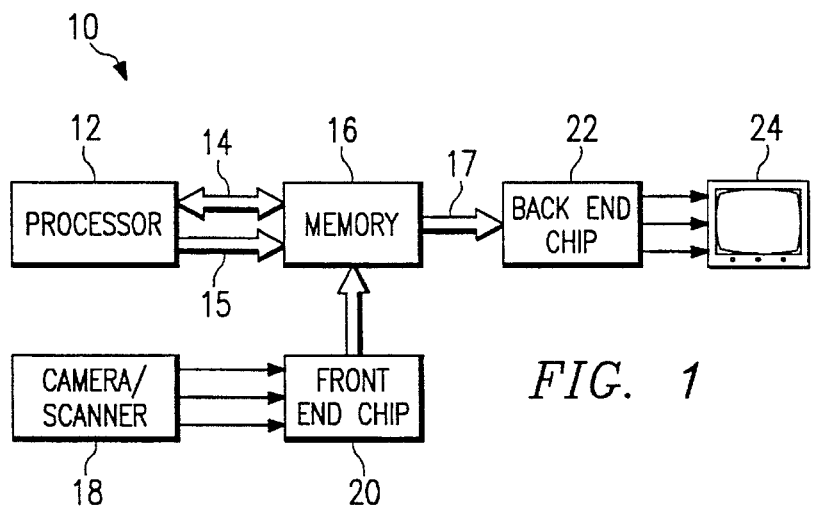
FIG. 1 is a functional block diagram of an imaging system.

FIG. 1 generally depicts a imaging system 10 which includes a processor 12 connected via a bidirectional data bus 14 and an address bus 15 to a memory 16. Processor 12 is preferably an image system processor (ISP) such as that described in copending and coassigned application Ser. No. 07/435,591, incorporated herein by reference.

A camera or scanner 18 provides a sensor coupled to a front end chip or circuit 20. Front end chip 20 is coupled to memory 16 to provide incoming sensor information thereto. Sensor 18 is in general any sensor capable of providing information that represents or is convertible into a vector or matrix of information such as an image. For instance sensor 18 can be an optical sensor in visible, infrared or ultraviolet range. In volume commercial systems sensor 18 may be a CCD (charge coupled device) sensor or a video camera. Alternatively, sensor 18 may be an antenna for receiving image data transmitted in the radio portion of the electromagnetic spectrum. X-ray, gamma ray, or other particle sensors are also alternatives in the electromagnetic realm. Ultrasonic sensors, nuclear magnetic resonance (NMR) imagers and photomultipliers in medical and other scientific applications are still further alternatives.

The memory 16 supplies output through bus 17 to a back end chip or circuit 22 such as a color palette which feeds control signals for driving a video monitor 24. Monitor 24 is representative of a variety of display means such as raster scan and other CRT(cathode ray tube) video displays, LCD (liquid crystal display) devices, laser printers and other printer devices, photograph-generating devices, and other image display devices.

Figure 2:
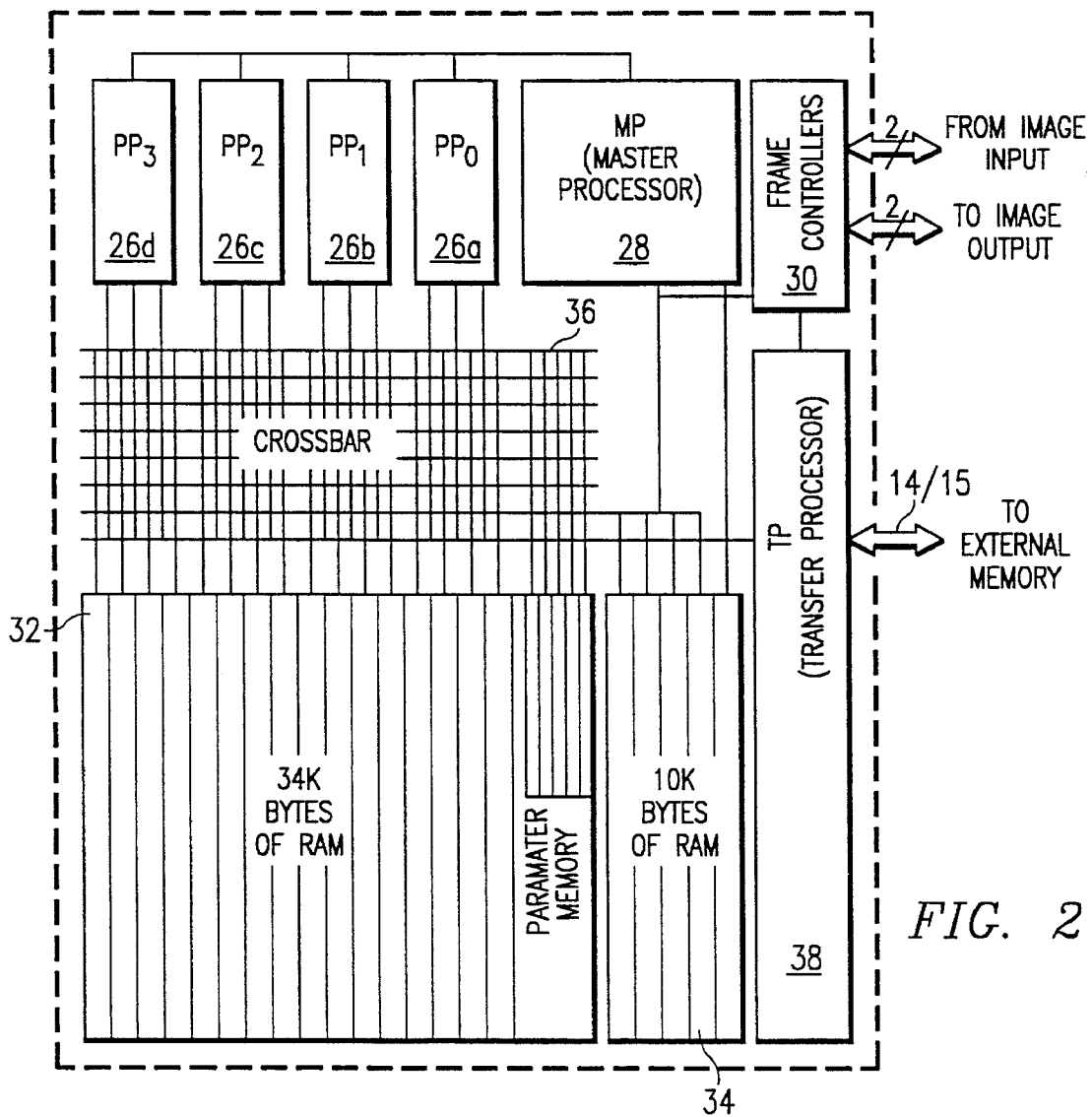
FIG. 2 is a functional block diagram of one embodiment of the image signal processor shown in FIG. 1.
Figure 3:
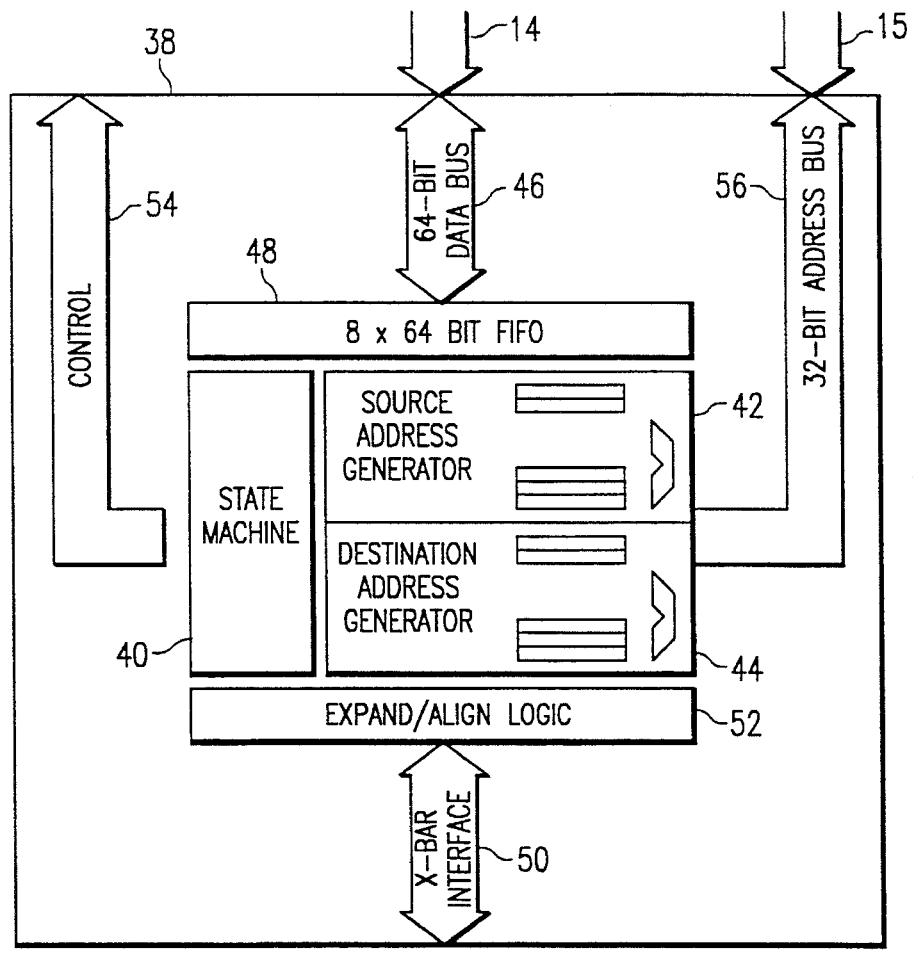
FIG. 3 is a functional block diagram of one embodiment of the transfer processor shown in FIG. 2.

FIG. 2 is a functional block diagram of an embodiment of image system processor 12. Processor 12 includes a plurality of parallel processors 26a–26d, a master processor 28, frame controllers 30, memory 32, data/instruction cache 34, and crossbar switch 36. A complete description of each of these functional blocks in a preferred embodiment of ISP 12 is provided in copending and coassigned application Ser. No. 07/435,591, incorporated herein by reference. Of importance to the present discussion is transfer processor 38, which is depicted in further detail in FIG. 3. Transfer processor 38, includes state machine control circuitry 40, a source address generator 42, a destination address generator 44, an interface 46 with data bus 14 via first-in/first-out circuitry 48, an interface 50 with crossbar switch 36 through expand/align logic 52, an interface 54 with frame controllers 30, and an interface 56 with address bus 15. A detailed description of these blocks is also provided for a preferred embodiment of image system processor 12 in co-pending application Ser. No. 07/435,591.

Processor 12 as an image system processor chip has a memory organization which efficiently utilizes the memory-to-processor bus 14 bandwidth, and displays a color and alpha channel image in real-time. Bus 14 in the illustrated embodiment is a 64-bit data bus and bus 15 a 32-bit address bus. With a 64-bit bus 14, several types of memory accesses should be available for selection on any memory cycle: (A) two 32-bit pixels, (B) eight 8-bit "guns" or (C) sixty-four 1-bit controls (block write). Selection (C) supplies a number N of bits from memory equal in number to the bus width W (e.g. 64).

In general, selection (A) accesses N number of whole pixels where N is equal to the bit width W of bus 14 divided by the number of bits per pixels P (i.e. N=W/P). Selection (B) in general accesses a particular part ("gun") of several pixels at a time. The number of pixel parts or "guns" X accessed is equal to the bit width W of bus 14 divided by the number of bits B in each pixel part or gun (i.e. X=W/B). In the illustrated example where the bus width is sixty-four bits, 8 8-bit guns can be selected per memory cycle. In color imaging, the parts of pixels (guns) are associated with the color guns for red, green, and blue. A blending factor designated "alpha" is used to relate the pixel parts of a frame to construct an image that blends the pixel parts in the manner of a weighted average. By analogy, alpha is called a gun, even though there is no physical gun in a color picture tube which receives the alpha information.

For color video purposes, the information content of each pixel held in the memory 16 is represented by a vector including a specified number of bits representing each of the four guns. Accordingly, in the present example, where each pixel is defined as having thirty-two bits and each gun defined as having eight bits, a given pixel can represented by the vector (R8, GS, BS, Alpha 8).

Because red, green and blue are related in color television practice by matrix operations to luminance Y, chrominance component I and chrominance component Q, the image storage may alternatively be arranged so that each pixel is represented by sets of bits for Y, I, Q, and alpha. Because the human eye discriminates luminance with higher resolution than chrominance, equal number of bits are not required for each component, and the numbers of bits actually assigned in memory for particular components may accordingly be optimized for the application.

Specific details of example devices and systems available for the construction of embodiments of system 10 can be found in coassigned patents:

U.S. Pat. No. 4,807,189, entitled "A Read/Write Memory Having a Multiple Column Select Mode", issued Feb. 21, 1989;

U.S. Pat. No. 4,636,986, entitled "Separately Addressable Memory Array in a Multiple Array Sense Conductor Chip", issued Jan. 13, 1987;

U.S. Pat. No. 4,639,890, entitled "Video Display System Using Memory with Parallel and Serial Access Displaying Selectable Cascaded Serial Shift", issued Jan. 27, 1987; and U.S. Pat. No. 4,562,435, entitled "Video Display System Using Serial/Parallel Access Memories", issued Dec. 31, 1985.

Figure 4:
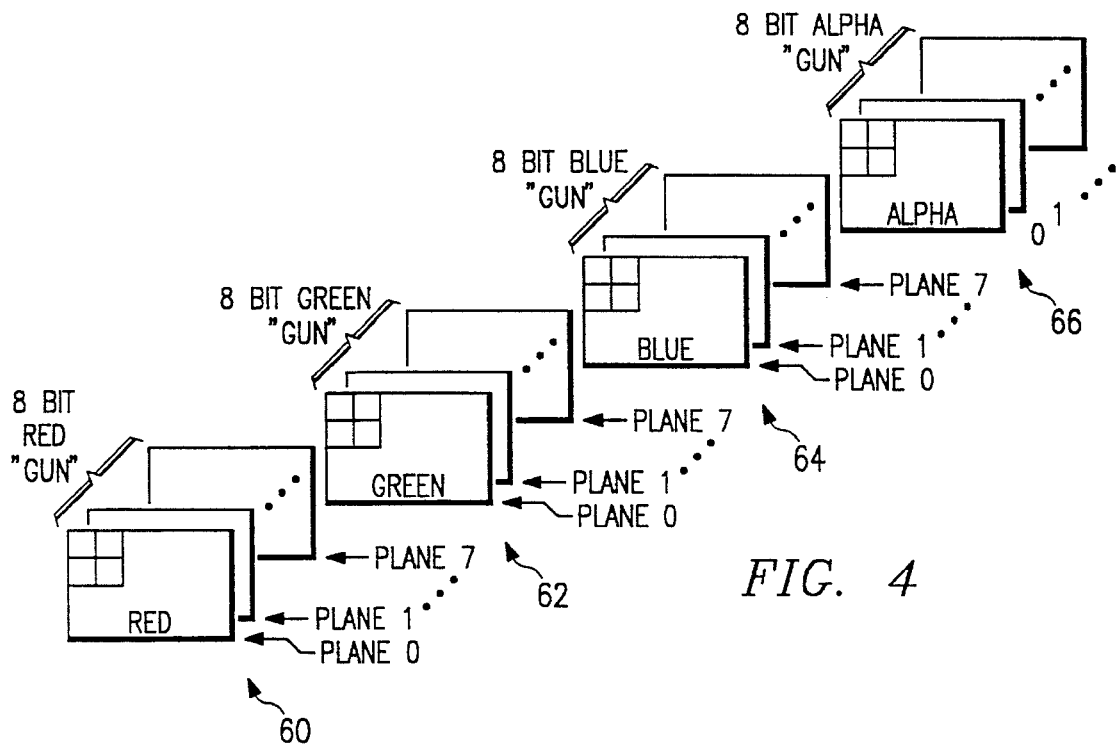
FIG. 4 is a geometric representation of the planes of a video random access memory storing words of pixel data organized into gun portions.

FIG. 4 shows a bit-mapped memory organization of memory 16 in which each pixel is represented by eight bits each of red, green, blue and alpha data (R8, G8, B8, Alpha 8). The depicted organization for memory 16 has thirty-two planes for the thirty-two bits per pixel. The thirty-two planes are organized into four gun portions having eight planes (0–7) each for red (60), green (62), blue (64) and alpha (66). The bits in each plane are stored in rows and columns corresponding in number in the depicted example to the number of scan lines per frame and number of pixels per line, respectively, in an image. As discussed above, it should be emphasized that the identification of parts of memory as gun portions by color is arbitrary and suggestive of but one typical application. For economy of terminology, however, any division of the memory planes into portions or access of the memory by subsets of memory planes is called "gun oriented" herein. Also, it should be understood that associating bits with pixels according to the bit-mapped organization is not a requirement, and that representations of varying spatial and chromatic precision allow optimization of the image storage. Moreover, those representations can reside anywhere in system memory, such as in SRAM (static ram) on ISP chip 12, as well as in memory 16 as display buffer.

Figure 5:
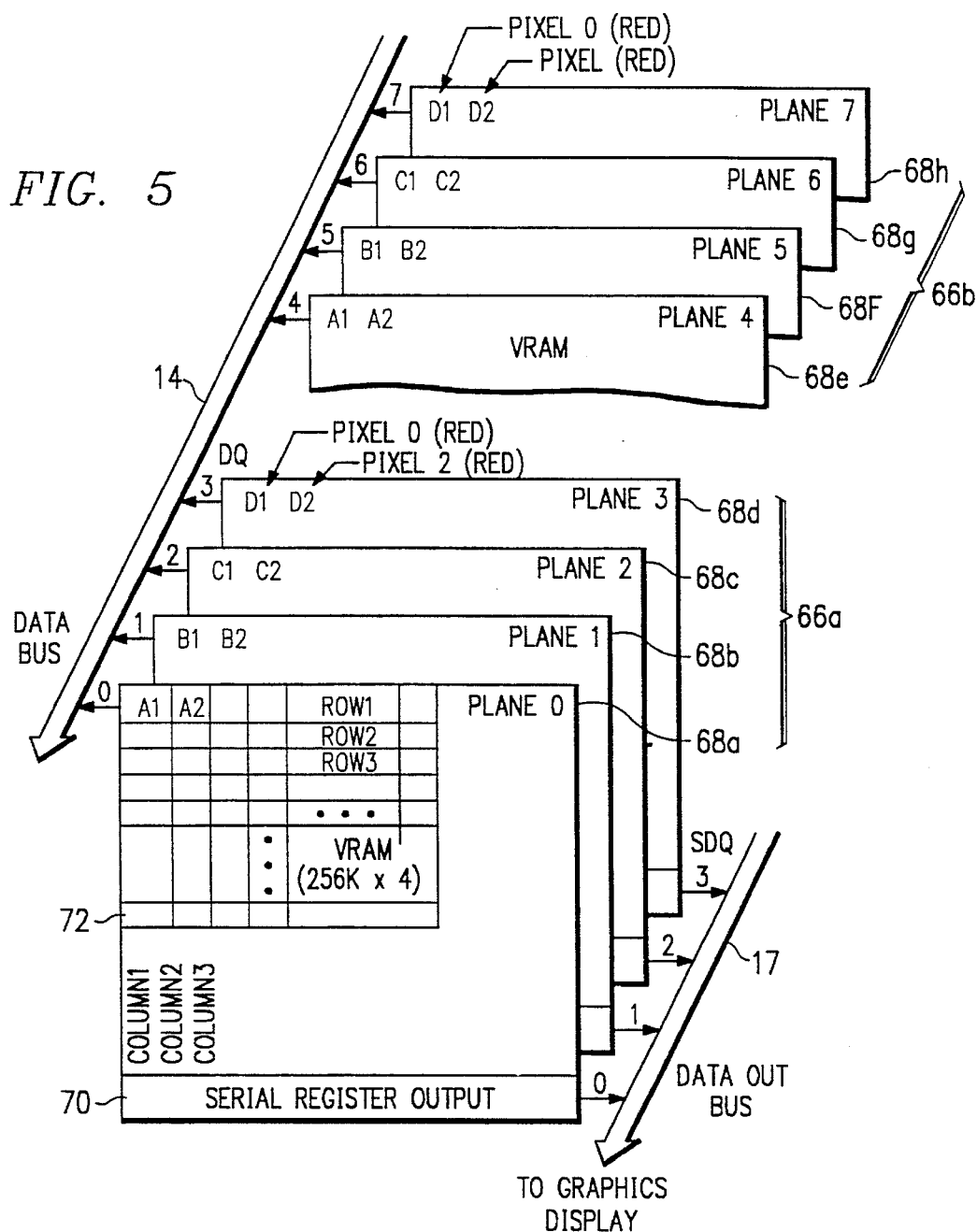
FIG. 5 is a detailed diagram of the planes of a video random access memory holding a selected one of the gun portions shown in FIG. 4.

FIG. 5 emphasizes the advantages of gun orientation, by more fully illustrating as an example red gun portion 60 of memory 16 as shown in FIG. 4. In the example shown in FIG. 5 gun portion 60 is implemented using two 256K×4 VRAM devices 66a and 66b however, in alternate embodiments other VRAM device architectures, such as 128K×8 VRAMs, may be used. Gun portion 60 is disposed across eight video RAM planes 68a–68h respectively connected for random access to data bus 14. A serial shift register 70 is associated with each video RAM plane and loaded in parallel from the plane. Eight parallel serial shift registers 70 are thus provided for eight planes, and serially provide the eight-bit guns for a line of video at the system horizontal scan rate on a bus 17 to back end chip 22 of FIG. 1 and graphics display 24. In FIG. 4, the address ports to each VRAM device 66a and 66b have not been shown for clarity.

Gun-oriented memory access as described herein advantageously permits rapid operations on gray images (luminance) and on color primaries R, G, and B, for instance. Thus, the preferred embodiments involve memory architectures specially streamlined for selection of access either by whole pixels or parts thereof.

Figure 6:
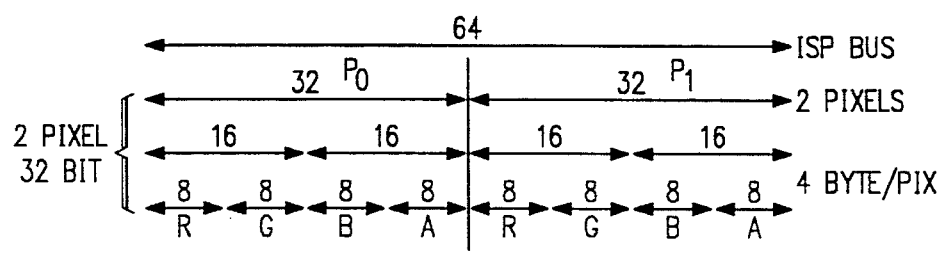
FIG. 6 depicts one possible pixel prefered organization of graphics data on the data bus shown in FIG. 1.

FIGS. 6 and 7 distinguish pixel access from gun access. In FIG. 6, a 64-bit wide bus 14 accommodates two 32-bit pixels per access in pixel access mode. In a single memory access, two pixels P0 and P1 are retrieved. Each pixel has four bytes each of R (red), G (green), B (blue), and A (alpha) data (the "gun portions"). In FIG. 7, the R (red) bytes from not two but eight pixels P0–P7 are accessed in a single memory access in the gun access mode. The green, blue and alpha gun portions from the same eight pixels P0–P7 or the red, blue, green and alpha of a second set of eight pixels are independently accessible in a subsequent memory access cycle.

FIG. 8 shows that a data bus 14 which is a multiple in width W of the number P of bits per pixel (in the described example a 64-bit bus supporting two 32-bit pixels), can support pixel accesses from several selections among adjacent pixels in memory 16. In a first selection shown as FIG. 8a, adjacent bits of pixels in the same row of storage locations are selected (a "2×1 access"). A second selection shown in FIG. 8b is directed to selecting adjacent bits of pixels in the same column of storage locations (a "1×2 access"). FIGS. 9a–d show four illustrative modes of gun access to memory 16. These modes of memory access permit fast input/output when objects have shape or placement in an 8×8 grid, similar to those shown by grid 72 of FIG. 5. Grid 72 is illustrative and there is no requirement that it be bordered at top and left.

In FIG. 9a, a particular, gun portion is accessed from each of eight locations in the same row of storage locations in memory 16 in a "1×8 access". In this example, eight red guns are accessed from eight locations (across eight planes 68a–68g) along row 2 of VRAMs 66a and 66b. In FIG. 9b, the selected gun portion is accessed in a second mode which takes each of eight bits from each plane lying in a 2×4 rectangle of bits in two adjacent rows (i.e. a "2×4 access"). In one example, FIG. 9b represents four bits per row in rows ROW2 and ROW3 across the eight memory planes 68a–68g of the selected gun portion 60. Sixty-four bits total are also accessed in this mode. In FIG. 9c, the selected gun portion is accessed in a third mode that selects eight bits in a column (e.g. COLUMN3) of a given plane. In this example, FIG. 9c represents eight bits from the eight columns COLUMN3 in all of the memory planes of the selected gun portion 60, for a total of sixty-four bits (i.e. an "8×1 access"). In FIG. 9d, the selected gun portion is accessed in a fourth mode that selects of each of eight bits lying in a 2×4 rectangle of bits in two adjacent columns (i.e. a "2×4 access"). In this example, FIG. 9d represents four bits per column in columns COLUMN3 AND COLUMN4 in the eight memory planes of the selected gun portion 60, again totaling sixty-four bits.

In FIG. 10 data is sorted on the data bus of image system processor 12 by the transfer processor 38 according to a process or method called a gun sort. Pixel access of a typical 32-bit pixel P0 retrieves bits for all guns from the most significant to the least significant bits in eight guadruplets of RGBA bits. In a gun sort, transfer processor 38 accesses bits according to a mode such as in one of those shown in FIGS. 9a–9d. For example, in the mode of FIG. 9c, transfer processor 38 accesses the most significant R0 (red) bits from plane 0 of gun portion 60, for pixels P0, P1, P2, P3 and places them on the bus where the most significant RGBA bits of pixel P0 would be in pixel mode. The less significant R bits for these four pixels are entered on the bus 14 progressing in FIG. 7 to the right. The least significant R7 bits from plane 7 of red gun portion 60, for pixels P0, P1, P2, P3 are entered on the bus where the least significant RGBA bits of pixel P0 would be in pixel mode. A similar set of R0–R7 bits are entered on the thirty-two lines of the right half of the 64-bit data bus 14 for pixels P4–P7 (not shown).

A typical VRAM (video random access memory) such as that partially illustrated in FIG. 5 or any related memory device such as a DRAM (dynamic random access memory) has at least two port used for randomly accessing storage locations in the device: a random access port (DQ) and an address port. An address is presented to the address port and data is either read from or written to the addressed location through the random access data port. In its simplest form the data addressed is only one bit, and the memory device is called a "by one" device. For example, a megabit by one RAM has a million ($2^{20}$) different address locations and one bit of data at each location.

When data transfers of words wider than one are required, then a number of RAM devices or planes equal in number to the word width are connected in parallel. Each of the RAM devices receives the same address and control signals so that multiple bits are transferred simultaneously to or from "parallel" locations in the devices. For example, a megabit RAM is organized as 256K ×4, meaning that there are 256K ($2^{18}$) address locations (different addresses decodable by an internal address decoder from 18 address lines), and four bits of data are stored at each address location. Internally, a 256K×4 memory is organized as four identical matrices or "planes", each plane having 256K bits of data, with the same control signals going to each matrix or plane internally. An address is presented, and the corresponding location is accessed within each array, supporting a transfer of four bits of data at once, upon a read or a write. Eighteen (18) address bits specify any one at a time of the 256K addresses. For conciseness let the symbol X symbolize the fourteen most significant bits and address lines.

Figure 11:
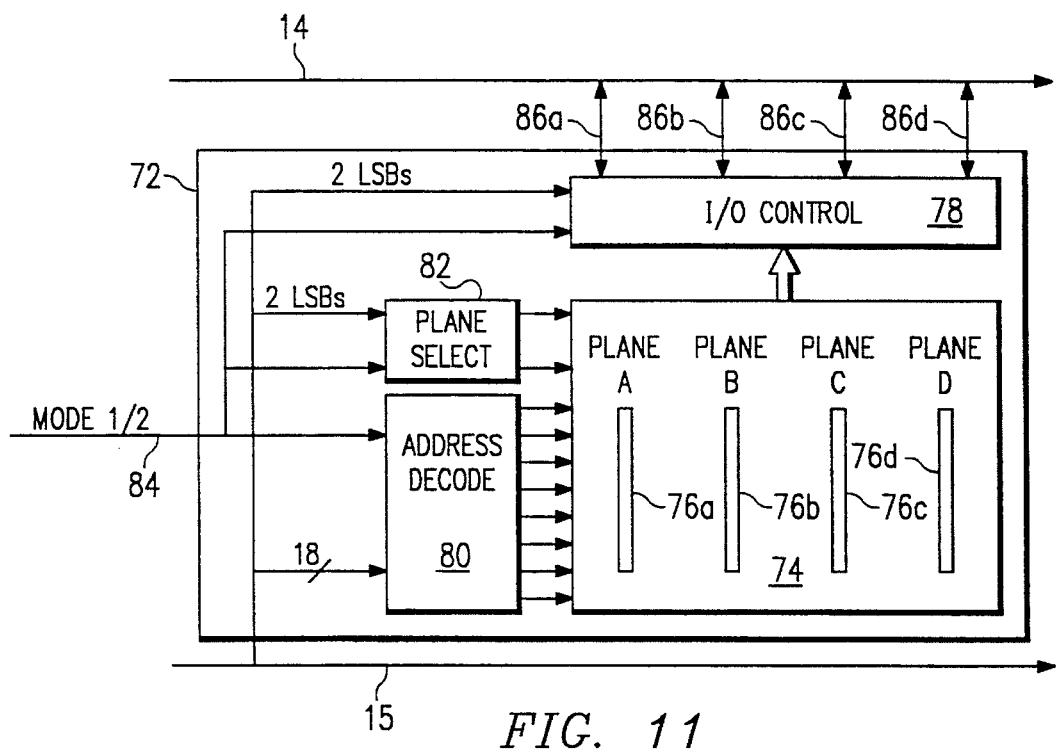
FIG. 11 depicts a first illustrative embodiment of a random access memory according to the present invention.

FIG. 11 depicts an improved by RAM device 72 or "Dual View RAM" according to one embodiment of the present invention. RAM 72 may be a dynamic RAM (DRAM) or video RAM (VRAM), in the case of a VRAM a serial output port (SDQ) is also provided (not shown in FIG. 11 for clarity). In the illustrated embodiment, dual view RAM is a 256K×4 device, however, the inventive concepts can be applied to alternate configurations, such as found in "by eight" devices. RAM 72 includes an array of random access memory cells 74 organized as four planes 76a–d, each plane coupled to I/O control circuitry 78. RAM 72 includes a address decoder 80 receiving 18 address bits from address bus 15. The two least significant bits of the 18 address bits received from bus 15 are also provided to plane selection control circuitry 82 and I/O control circuitry 78. A mode control signal is provided to address decoder 80, plane selection control circuitry 82, and I/O control circuitry 78 from image system processor 12 on line 84 which directs RAM 72 to operate in one of the two modes discussed below. Conductors 86a–d coupled to I/O control circuitry 78 provide the random access (DQ) port to data bus 14.

In the first mode, a given 18-bit address accesses a given one of the 256k cells in each of the four planes 76a–d such that one bit from each plane is provided on a corresponding DQ output conductors 86. For example, accessing address location X0000 in the first mode causes a transfer (either a read or write) of a bit data to or from location X0000 of each of the four planes 76a–d through corresponding random outputs (DQ) 86a–d. Access of address location X0010 in the first mode similarly causes a transfer of a bit of data to or from location X0010 of each of the four planes 76a–d to the four data lines 86a–d, and so on.

In a second mode, the illustrated embodiment of FIG. 11 advantageously provides for an alternative type of access. In the second mode the two least significant (LSB) bits of the address are used to specify one the four identical planes 76a–d to be accessed, and an address map of all four possible combinations of those two LSB address bits are decoded. For illustration purposes, assign designator letters A=00, B=01, C=10 and D=11, where the two bit numbers are the two LSB address bits being output from image system processor 12. These letters are equally meaningfully interpreted as arbitrary designators of memory devices or planes interpreted as gun portions R, G, B and A. For example, each plane may be designated to store bits of red, green, blue or alpha data. In this illustration of the second mode, presenting the last two bits of the address as 00 to address decoder 80, plane selection circuitry 82 and I/O circuitry 78 cause access to the memory in four locations solely in the A memory plane 76a and not from planes B, C, or D. The four accessed locations are suitably X0000, X0001, X0010 and X0011 in the A plane with four corresponding bits transferred through DQ port conductors 86a–d.

As a second illustration of the second mode, asserting an address X0101 to the memory presents the last two bits 01 to RAM 72 as a request for access solely to the B memory plane 76b from B memory plane locations X0100, X0101, X0110 and X0111 and no access to any of the other three memory planes A, C and D. In this, four bits are transferred to or from locations X0100, X0101, X0110, and X0111 through DQ conductors 86a–d.

Further examples in the second mode are address X1111 which accesses the D memory plane 76d only and in four locations X1100, X1101, X1110, and X1111. Address X0010 would access the C memory plane 76c only, in locations X0000, X0001, X0010 and X0011.

Figure 12:
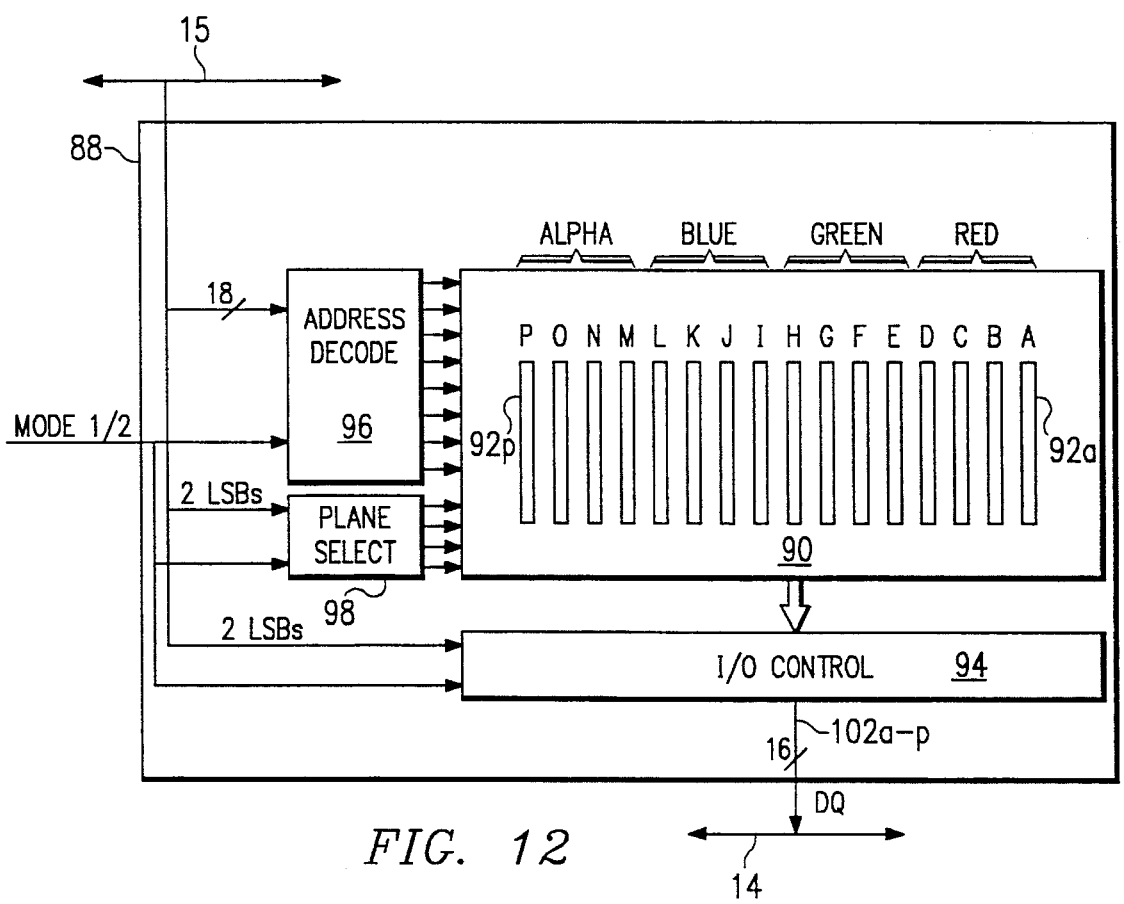
FIG. 12 depicts a second illustrative embodiment of a random access memory according to the present invention.
Figure 13A:
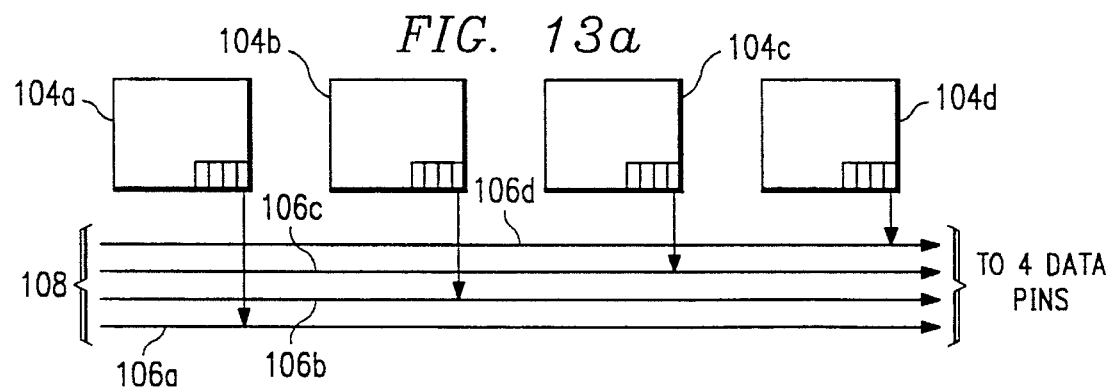
FIGS. 13a–d illustrate the access of data from four planes of a random access memory according to the invention.
Figure 13B:
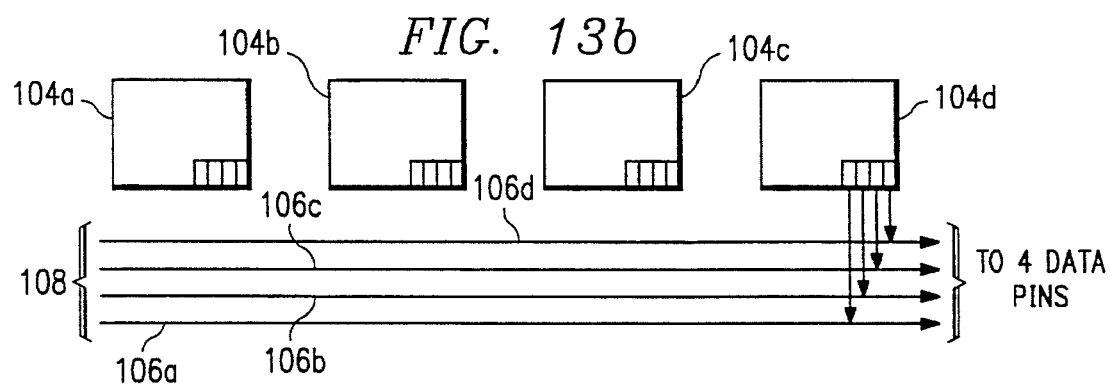
Figure 13C:
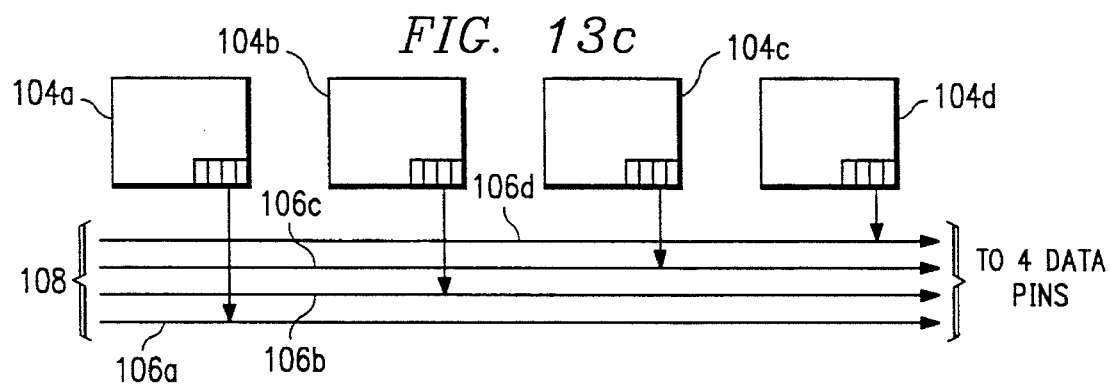
Figure 13D:
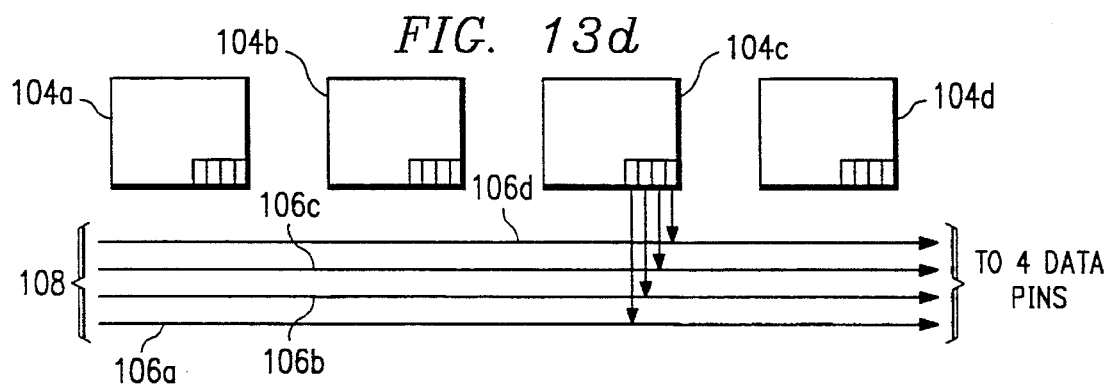

A 4 megabit video RAM (VRAM) embodiment 88 having these two modes includes a random access memory cell array 90 organized as 256K×16 as depicted in FIG. 12. For clarity, the serial port (SDQ) and its associated shift registers are not shown. RAM 90 includes an array of random access memory cells 90 organized as sixteen planes 92a–p of 256K locations each, each plane coupled to I/O control circuitry 94. RAM 88 includes a address decoder 96 receiving eighteen address bits from address bus 15. The two least significant bits of the eighteen address bits received from bus 15 are also provided to plane selection control circuitry 98 and I/O control circuitry 94. A mode control signal is provided to address decoder 96, plane selection control circuitry 98, and I/O control circuitry 94 from image system processor 12 on line 100 which directs RAM 88 to operate in one of the two modes discussed below. Sixteen conductors 102a–p coupled to I/O control circuitry 94 provide the random access (DQ) port to data bus 14. In the second mode, the arrays can be accessed in groups of four, such as four planes for each gun portion.

In the illustrated embodiment, memory planes 92a–p and the corresponding guns are designated as follows as defined by the two LSB address bits:

Red=00 designates planes 92a–d (A–D)

Green=01 designates planes 92e–h (E–H)

Blue=10 designates planes 92i–l (I–L)

Alpha=11 designates planes 92m–p (M–P)

In the first mode, asserting address X0000 to memory 88 causes access to the 16 data bits at location X0000 in each of the sixteen identical memory planes 92a–p. In this video display example, this provides pixel access to four bits each of red, green, blue and alpha data in parallel through the sixteen bit random port (DQ) 102. Asserting another address X0101 similarly causes access to the 16 data bits at locations X0101 of each of the 16 identical memory planes 92a–p, and so on.

In the second mode (in this example), asserting address X0000 to memory 88 causes sole access of the four memory planes 92a–d (A–D) designated by the A=00 LSB address bits. None of the other twelve memory planes are accessed by these two LSBs in the second mode in this example. Four adjacent locations are simultaneously accessed in the second mode in each of these four accessed memory planes 92a–d. These locations are AX0000, AX0001, AX0010, AX0011, BX0000, BX0001, BX0010, BX0011, CX0000, CX0001, CX0010, CX0011, DX0000, DX0001, DX0010, DX0011. In this fashion, four 4-bit red guns are accessed by a single address in the illustrated video system configuration.

Another example address X1111 in the second mode causes access only of the memory matrices 92m–p due to the LSB address bits being Alpha=11. In other words, memory planes 92a–l are not accessed by this asserted address in the second mode in this example. Instead four adjacent locations are accessed in each of the four accessed memory planes 92m–p (M–P) thereby providing four 4-bit alpha guns. These locations are MX1100, MX1101, MX1110, MX1111, NX1100, NX1101, NX1110, NX1111, OX1100, OX1101, OX1110, OX1111, PX1100, PX1101, PX1110, and PX1111.

Similarly, dynamic RAMs and video RAMs can be configured to provide for varying numbers of bits per pixel or gun and interface with varying width buses. For example, to provide 32-bit pixels comprised of 8-bit guns, as described above in connection with video system 10, 32 planes grouped for addressing in groups of eight is advantageous. It is also important to recognize that the address space of the RAMs being used is also a factor. Address space K can be traded off with number of bits B in each gun portion in the architecture of a memory of a given size M, because M=KB. In other words, the memory size is the product of the address space size K and number of bits B, bits B being equal in number to the number of planes in the RAM. Accordingly, a 16 megabit video RAM can support 512K address space and 32-bit pixels of four 8-bit guns. A 4 megabit video ram can support 32-bit pixels of four 8-bit gun portions, provided the address space is 128K. The one megabit by one memory example described above in connection with FIG. 11 is interpreted as a 256K address space with 4-bit pixels of 4 one-bit gun portions. The 4 megabit example of FIG. 12 is interpreted as a 256K address space with 16-bit pixels of 4 four-bit gun portions. It is important to note that the required memory space need not be provided but a single RAM device by may be constructed by a bank of parallel devices such as RAM devices 72 and 88 described above.

FIG. 13 further illustrates the access of data from a random access memory embodying the concepts of the present invention. As an example, four planes 104a–d are shown coupled to the conductors 106a–d of an internal bus 108. In FIG. 13a an address of X0000 is being presented to the associated address input (not shown) in a first mode, with data from the same corresponding bit position of each of the four planes 104a–d being accessed through conductors 106a–d. In FIG. 13b, the same address of X0000 is being presented in a second mode, but in this instance, four adjacent bits from only plane 104d are being accessed through conductors 106a–d. In FIG. 13c, an address of X0001 is being presented in the first mode with the same corresponding bit position from each plane 104a–d accessed through bus 108. As a final example, in FIG. 13d, the address of X0001 is being presented in the second mode with four corresponding adjacent bits from plane 104c being accessed. For the example 16 bit positions shown in FIGS. 13a–d there are eight possible combinations of accesses, four of which are depicted for illustrative purposes.

The embodiments of the present invention advantageously provide for the access of whole pixels and parts of pixels when used in graphics system 10. For example, in the first mode a memory holding 32-bit pixels of 8-bit gun portions, all thirty-two identical memory matrices are accessed in the same location at once to access thirty-two bits of a pixel. In the second mode, only a block of eight of the thirty-two memory planes are accessed, however, these eight memory matrices are accessed in 4 adjacent addresses such as X0000, X0001, X0010 and X0011 such that same 8-bit gun portion of four pixels is accessed. Depending on the organization and decoding of the memory array, the accesses shown in FIGS. 9a–9b can be realized.

When two sets of 32-bits can be accessed at once as in the examples of earlier FIG. 12, pixel access in the first mode accesses two pixels. Gun access in the second mode accesses 8-bit gun portions of eight pixels are accessed as shown in FIGS. 8a–8b.

Thus, the embodiments of the present invention provide significant advantages over existing memory systems. Two modes in the just described embodiment are useful because a video RAM system generally needs information of different types for different processing purposes. In one type of processing, all of the bits associated with a specific pixel need to be available simultaneously on both a random port (DQ) and a serial port (SDQ) as shown above in FIG. 5. Other processing operations in the same application often need information for an area of the frame but need it for only one portion of the pixel information or "gun" at a time, such as "red" or "luminance". The inventive concepts described herein provide the required operational flexibility.

Although the present invention and its advantages have been described in detail, it should be understood that various changes, substitutions and alterations can be made herein without departing from the spirit and scope of the invention as defined by the appended claims.

What is claimed is:

1. A memory device comprising:

a plurality of data storage locations, said plurality of data storage locations disposed in a plurality of N planes, each data storage location in each of said N planes having an associated address;

a bidirectional data port; and control circuitry connected to said plurality of data storage locations and said bidirectional data port, said control circuitry having inputs for receiving an address signal and a mode control signal, said mode control signal indicative of either a first mode or of a second mode, said control circuitry (1) operable in said first mode to transfer data from said bidirectional data port to a data storage location associated with an address corresponding to said received address signal in each of said plurality of N planes during a write access and to transfer data from a data storage location associated with said received address signal in each of said plurality of N planes to said bidirectional data port during a read access, and (2) operable in said second mode to transfer data from said bidirectional data port to a plurality of N data storage locations in a selected one of said planes during a write access and to transfer data from a plurality of N data storage locations in a selected one of said planes to said bidirectional data port during a read access.

2. The memory device of claim 1 wherein a said address comprises a plurality of parallel bits including a plurality of least significant bits, said control circuitry in said second mode selecting said selected one of said planes in response to said least significant bits.

3. The memory device of claim 1 wherein said plurality of planes comprise four planes and said plurality of least significant bits comprise first and second least significant bits.

4. The memory device of claim 1 wherein said plurality of N data storage locations accessed in said selected one of said planes in said second mode comprise N adjacent data storage locations in said selected plane.

5. The memory device of claim 1 wherein said plurality of N data storage locations in said selected one of said planes in said second mode have N consecutive associated addresses, a first of said N consecutive associated addresses corresponding to said received address signal.

6. A random access memory device comprising:

a plurality of data storage locations said plurality of data storage locations disposed in a plurality of N planes, each data storage location in each of said N planes having an associated address, and said N planes organized as a plurality of groups;

a random access bidirectional data port; and control circuitry connected to said plurality of data storage locations and said random access bidirectional data port, said control circuitry having inputs for receiving a multibit address signal and a mode control signal, said mode control signal indicative of either a first mode or of a second mode, said control circuitry (1) operable in said first mode to transfer data from said bidirectional data port to a data storage location associated with an address corresponding to said received address signal in each of said plurality of N planes during a write access and to transfer data from a data storage location associated with an address corresponding to said received address signal in each of said plurality of N planes to said bidirectional data port during a read access, and (2) operable in said second mode to transfer data from said bidirectional data port to a plurality of N data storage locations in a selected one of said groups during a write access and to transfer data from a plurality of N data storage locations in a selected one of said groups to said bidirectional data port during a read access, said control circuitry selecting said selected one of said groups in response to a predetermined number of least significant bits of said received address signal.

7. The random access memory of claim 6 wherein each said group comprises a plurality of said planes.

8. The memory device of claim 7 wherein said control circuitry in said second mode accesses a plurality of data storage locations in each of said plurality of said planes in said selected group.

9. The memory device of claim 8 wherein said control circuitry accesses a plurality of adjacent data storage locations in each of said plurality of planes of said selected group in said second mode.

10. The memory device of claim 8 wherein said control circuitry accesses a plurality of data storage locations having consecutive addresses in each of said plurality of planes of said selected group in said second mode, a first of said consecutive addresses in each plane corresponding to said received address signal.

11. The memory device of claim 7 wherein each of said groups includes the same number of said plurality of planes.

12. The memory device of claim 7 wherein at least one of said groups includes a number of said plurality of planes differing from a number of said plurality of planes of at least one other group.

13. The random access memory of claim 6 wherein the number of said least significant bits is equal to $\log_2$ of the number of said groups.

14. The memory device of claim 6 wherein said data storage locations accessed in said first mode have the same address.

15. A graphics processing system comprising:

a graphics processor for generating words of data defining an image to be displayed on an associated display device as a plurality of pixels, each said word comprising red, blue, green and alpha gun portions for said pixel; and a frame buffer coupled to said graphics processor for storing said words of data, said frame buffer including at least one random access memory device comprising:

a plurality of data storage locations, said plurality of data storage locations disposed in a plurality of N planes, each data storage location in each of said N planes having an associated address, and said planes organized as a plurality of groups, a first group for storing red gun portions of a plurality of pixels, a second group for storing green gun portions of a plurality of pixels, a third group for storing blue gun portions of a plurality of pixels and a fourth group for storing alpha gun portions of a plurality of pixels;

a random access bidirectional data port; and control circuitry connected to said plurality of data storage locations and said random access bidirectional data port, said control circuitry having inputs for receiving a multibit address signal and a mode control signal from said graphics processor, said mode control signal indicative of either a first mode or of a second mode, said control circuitry (1) operable in said first mode to transfer data from said bidirectional data port to said red, blue, green and alpha gun portions of a selected pixel by accessing data storage locations in each of said plurality of planes having an associated address corresponding to said received address signal during a write access and to transfer data from said red, blue, green and alpha gun portions of a selected pixel by accessing data storage locations in each of said plurality of planes having an associated address corresponding to said received address signal to said bidirectional data port during a read access, and (2) operable in said second mode to transfer data from said bidirectional data port to a selected one of said words of red, green, blue, and alpha gun portions of a plurality of pixels by accessing a plurality of N data storage locations in a selected said group during a write access and to transfer data from a selected one of said words of red, green, blue, and alpha gun portions of a plurality of pixels by accessing a plurality of N data storage locations in a selected said group to said bidirectional data port during a read access, said control circuitry selecting said selected group in response to a predetermined plurality of least significant bits of said received address signal.

16. The processing system of claim 15 wherein each said group comprises a plurality of planes, the number of planes in a said group equal to the number of bits comprising a said gun portion.

17. The processing system of claim 16 wherein each gun portions include the same number of bits.

18. The processing system of claim 16 wherein at least one of said gun portions includes a number of bits differing from a number of bits of at least one other gun portion.

19. The processing system of claim 15 wherein the number of said least significant bits is equal to $\log_2$ of the number of said groups.

* * * * *